US008209101B2

(12) United States Patent
Breit

(10) Patent No.: US 8,209,101 B2
(45) Date of Patent: Jun. 26, 2012

(54) METHOD AND SYSTEM FOR ADAPTIVE POWER MANAGEMENT

(75) Inventor: Joseph S. Breit, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 1288 days.

(21) Appl. No.: 11/512,809

(22) Filed: Aug. 29, 2006

(65) Prior Publication Data
US 2008/0058998 A1 Mar. 6, 2008

(51) Int. Cl.
*G06F 15/00* (2006.01)
(52) U.S. Cl. ........... 701/80; 361/62; 703/18; 701/3; 701/36; 701/29.1; 701/32.1
(58) Field of Classification Search ............ None
See application file for complete search history.

(56) References Cited

U.S. PATENT DOCUMENTS

| | | | | |
|---|---|---|---|---|
| 4,403,292 A * | 9/1983 | Ejzak et al. | ........... | 700/297 |
| 4,943,919 A * | 7/1990 | Aslin et al. | ........... | 701/3 |
| 5,074,495 A * | 12/1991 | Raymond | ........... | 244/78.1 |
| 5,208,590 A * | 5/1993 | Pitts | ........... | 340/973 |
| 5,386,363 A * | 1/1995 | Haak et al. | ........... | 701/3 |
| 5,615,105 A * | 3/1997 | Tofigh et al. | ........... | 700/9 |
| 5,627,744 A * | 5/1997 | Baker et al. | ........... | 363/165 |
| 5,936,318 A * | 8/1999 | Weiler et al. | ........... | 307/66 |
| 5,977,645 A * | 11/1999 | Glennon | ........... | 290/40 F |
| 6,335,694 B1 * | 1/2002 | Beksa et al. | ........... | 340/945 |
| 6,782,346 B2 * | 8/2004 | Bond et al. | ........... | 702/183 |
| 6,921,987 B2 * | 7/2005 | Marin-Martinod | ........... | 307/32 |
| 6,934,137 B2 * | 8/2005 | Elliott et al. | ........... | 361/62 |
| 7,098,555 B2 * | 8/2006 | Glahn et al. | ........... | 307/32 |
| 7,254,465 B2 * | 8/2007 | McGinley | ........... | 700/295 |
| 7,305,282 B2 * | 12/2007 | Chen | ........... | 700/291 |
| 7,439,634 B2 * | 10/2008 | Michalko | ........... | 307/43 |
| 2003/0204777 A1 * | 10/2003 | Kojori | ........... | 714/14 |
| 2004/0031880 A1 * | 2/2004 | Stemme et al. | ........... | 244/55 |
| 2004/0057177 A1 * | 3/2004 | Glahn et al. | ........... | 361/62 |
| 2004/0249521 A1 * | 12/2004 | Petersen et al. | ........... | 701/3 |
| 2005/0067530 A1 * | 3/2005 | Schafer et al. | ........... | 244/118.5 |
| 2005/0137764 A1 * | 6/2005 | Alvarez-Troncoso et al. | . | 701/36 |
| 2006/0095162 A1 * | 5/2006 | Schafer et al. | ........... | 700/275 |
| 2009/0070091 A1 * | 3/2009 | Hanke et al. | ........... | 703/18 |

* cited by examiner

*Primary Examiner* — Jonathan M Dager
(74) *Attorney, Agent, or Firm* — Toler Law Group

(57) ABSTRACT

In a non-limiting, exemplary embodiment, electrical power is adaptively managed. A profile of predetermined threshold levels of electrical loading is developed for phases of an operation. A profile of electrical loading is developed for the phases of the operation such that electrical loading is substantially a same predetermined margin below the predetermined threshold levels during the phases of the operation. During the phases of the operation, operational data indicative of an electrical power generation system's actual ability to support electrical loading and/or actual electrical loading is received. The profile of the predetermined threshold levels and/or the profile of electrical loading is adjusted responsive to the operational data such that electrical loading is maintained substantially the same predetermined margin below the predetermined threshold levels during the phases of the operation.

38 Claims, 9 Drawing Sheets

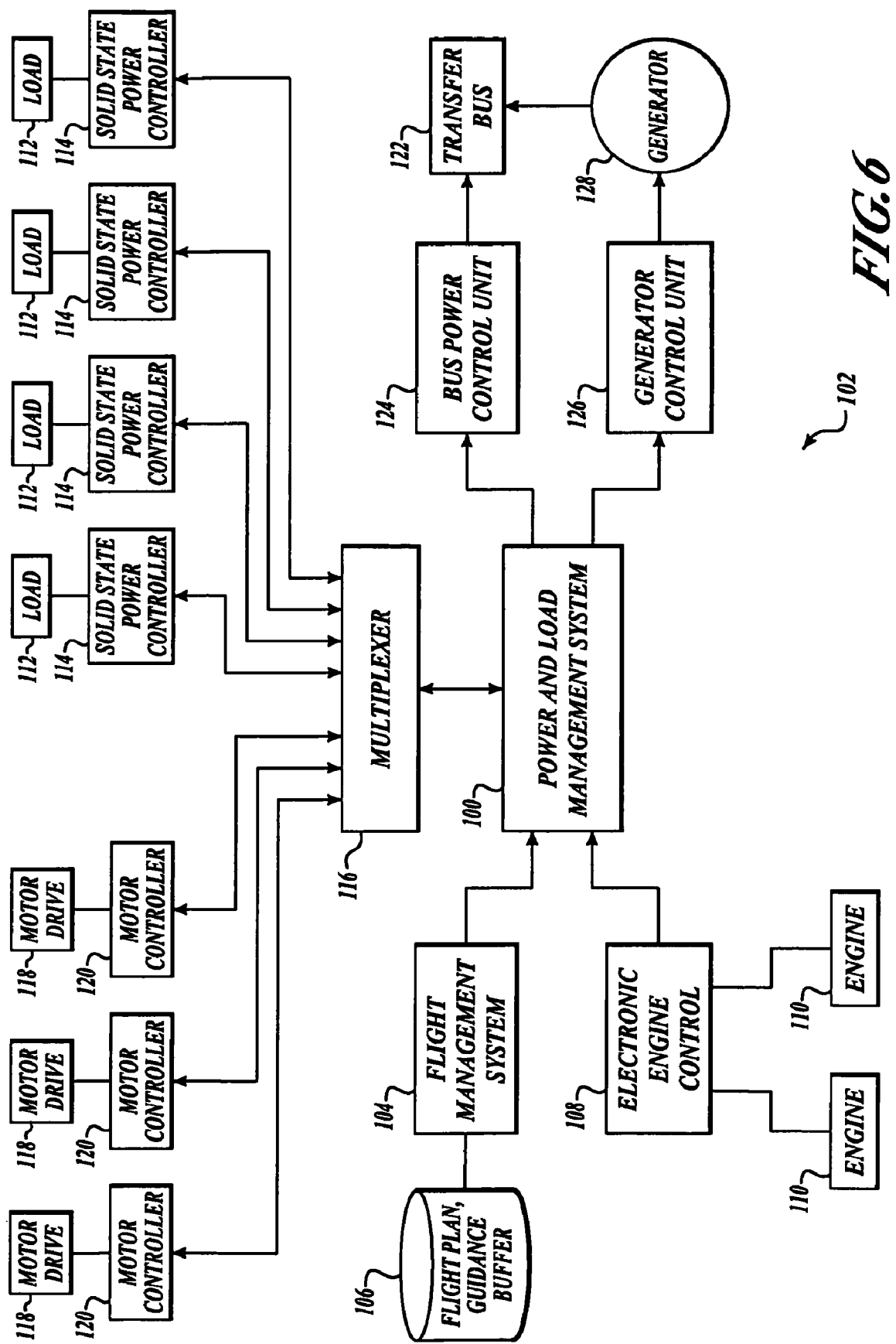

METHOD AND SYSTEM FOR ADAPTIVE POWER MANAGEMENT

BACKGROUND

Electrical power systems generate and distribute electrical power onboard vehicles, such as aircraft and maritime vessels, that are involved in operations, such as flights and voyages, cruises, or patrols. Typically, electrical power generators are rotated by a prime mover that also provides propulsion power for the vehicle. For example, onboard an aircraft an electrical generator is rotated by the aircraft's engine.

Thus, a finite amount of energy is available onboard a vehicle for an operation's propulsion and electrical power requirements. That is, the more energy that is converted into electrical power, the less energy is available for propulsion.

However, current aircraft designs emphasize use of more electrical power onboard an airplane and less use of engine bleed air in order to raise the overall efficiency of an aircraft engine. For example, an electrically powered direct drive starter may be used for start up and electrical power may be used instead of bleed air for an environmental control system onboard an aircraft. In such an arrangement, total electrical loading onboard an aircraft could be raised from around 100 kilowatt (KW) to around 1 megawatt (MW).

With such significant amounts of electrical power being generated and used onboard aircraft, it would be desirable to make the most efficient use of electrical power. However, current load management techniques are designed to protect electrical generators from overloads rather than optimizing electrical power management.

For example, in a typical load management technique, a proportional integral differential (PID) controller selects a threshold and monitors electrical loading. When the PID controller senses that electrical loading may exceed the threshold, the PID controller begins shutting down loads. Currently, loads can be prioritized, such as essential or non-essential loads. However, no operational planning information is used to optimize electrical power generation and electrical load information is not used to adapt electrical power to electrical loads.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

In a non-limiting, exemplary embodiment, electrical power is adaptively managed. A profile of predetermined threshold levels of electrical loading is developed for phases of an operation. A profile of electrical loading is developed for the phases of the operation such that electrical loading is substantially a same predetermined margin below the predetermined threshold levels during the phases of the operation. During the phases of the operation, operational data indicative of an electrical power generation system's actual ability to support electrical loading and/or actual electrical loading is received. The profile of the predetermined threshold levels and/or the profile of electrical loading is adjusted responsive to the operational data such that electrical loading is maintained substantially the same predetermined margin below the predetermined threshold levels during the phases of the operation. Thus, planning data as well as operational data may be used to optimize capability of an electrical power generating system. The electrical power generating system may be adapted to the load, and overall electrical loading may be reduced during each phase of the operation.

According to an aspect, the profile of the predetermined threshold levels and the profile of electrical loading may be compared during the phases of the operation. In such a case, the profile of the predetermined threshold levels and/or the profile of electrical loading may be adjusted in response to the comparison such that electrical loading is maintained substantially at the same predetermined margin below the predetermined threshold levels during the phases of the operation.

According to another aspect, in developing the profile of predetermined threshold levels an initial threshold level above which electrical load is not to be added to an electrical power generation system may be developed. An analysis is made regarding when in the operation the initial threshold level will be reached. Threshold levels below the initial-threshold level are established when the initial threshold level will not be reached, and threshold levels above the initial threshold level are established when the initial threshold level will be reached.

According to a further aspect, in developing the profile of electrical loading each of the plurality of phases of the operation may be divided into time periods. Electrical loads for a phase of the operation are sequenced among the time periods for the phase of the operation such that electrical loading is substantially equalized for all of the time periods of the phase operation. In sequencing the electrical loads, an electrical load may be scheduled to operate at its maximum electrical loading level in one of the time periods of a phase of the operation, and another electrical load is scheduled to operate at its maximum electrical loading level in another of the time periods of the phase of the operation.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 6 is a block diagram of an exemplary system for adaptively managing electrical power;

DETAILED DESCRIPTION

Figure 1:
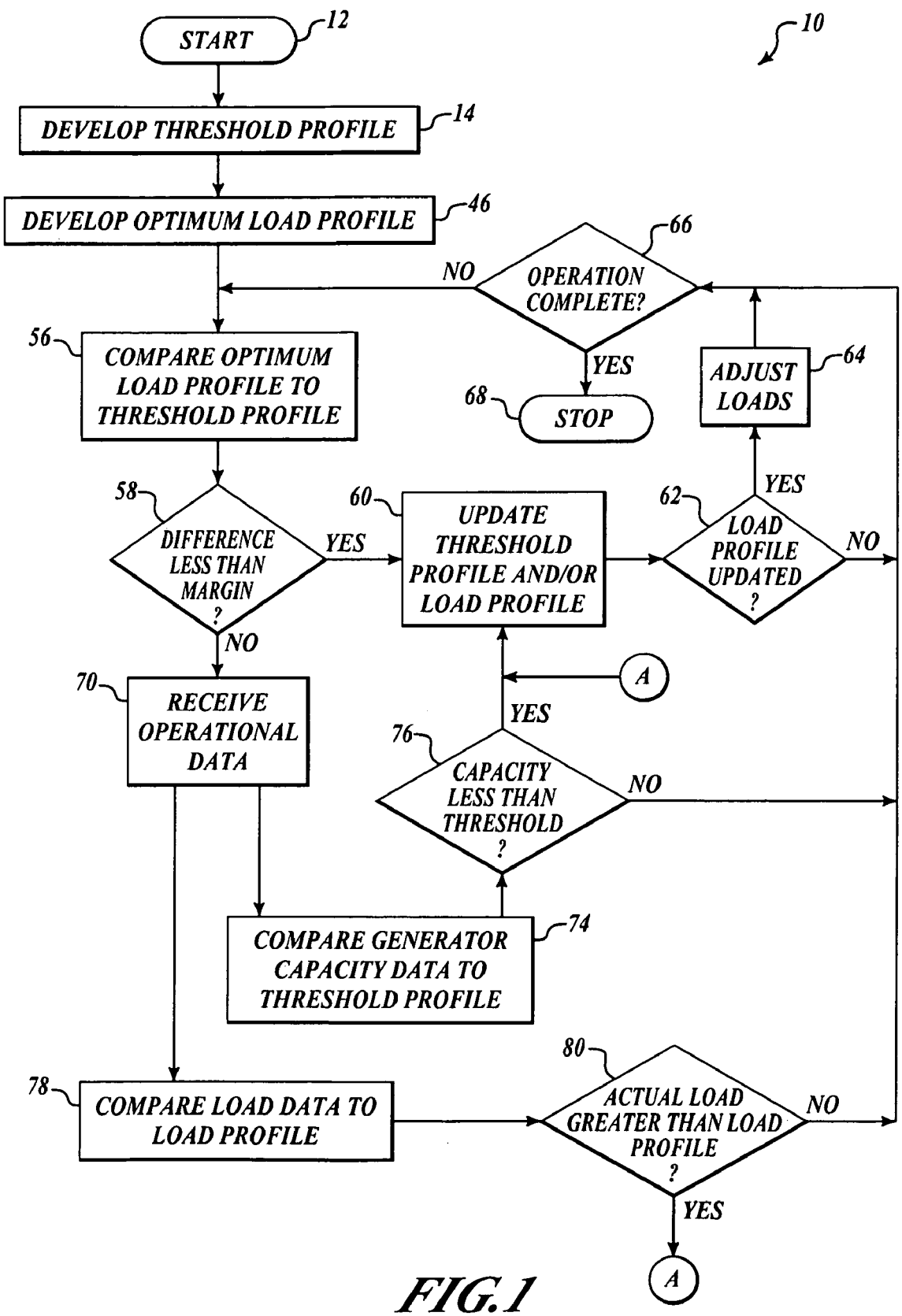
FIG. 1 is a flow chart of an exemplary method of adaptively managing electrical power.

By way of overview and referring to FIG. 1, in a non-limiting, exemplary embodiment electrical power is adaptively managed. In an exemplary method 10, at a block 14 a profile of predetermined threshold levels of electrical loading is developed for phases of an operation. At a block 46 a profile of electrical loading is developed for the phases of the operation such that electrical loading is substantially a same predetermined margin below the predetermined threshold levels during the phases of the operation. During the phases of the operation, at a block 70 operational data indicative of an electrical power generation system's actual ability to support electrical loading and/or actual electrical loading is received. At a block 60 the profile of the predetermined threshold levels and/or the profile of electrical loading is adjusted responsive to the operational data such that electrical loading is maintained substantially the same predetermined margin below the predetermined threshold levels during the phases of the operation. Thus, planning data as well as operational data may be used to optimize capability of an electrical power generating system. The electrical power generating system may be adapted to the load, and overall electrical loading may be reduced during each phase of the operation. Details of exemplary embodiments will now be set forth below.

Figure 2:
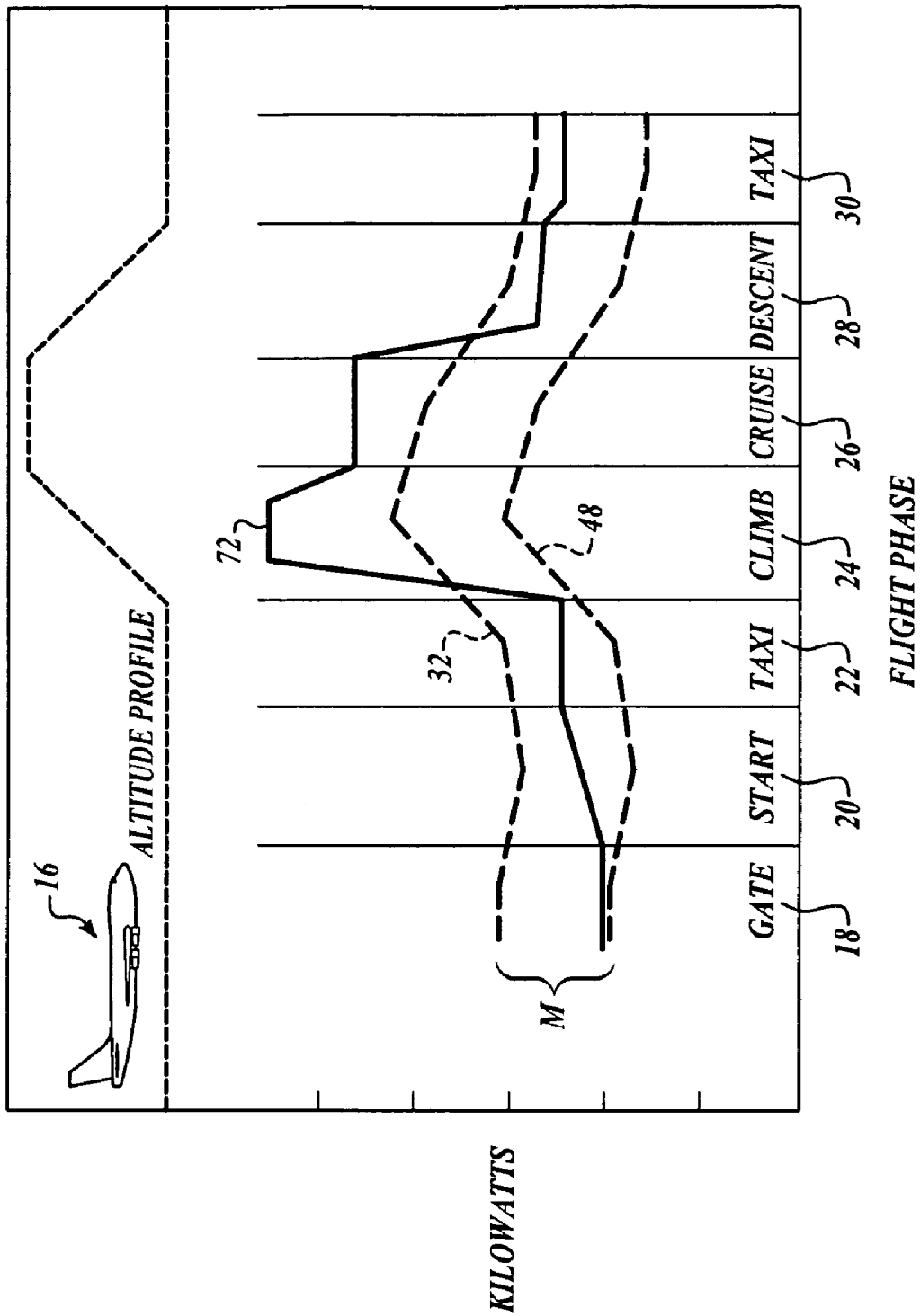
FIG. 2 illustrates an exemplary profile of threshold levels of electrical loading and an exemplary profile of electrical loading during phases of a flight.

The method 10 starts at a block 12 and proceeds to a block 14 at which a profile of predetermined threshold levels of electrical loading is developed for phases of an operation. Referring additionally to FIG. 2, in an exemplary embodiment, the operation is a flight of an aircraft 16. However, in other embodiments the operation may be other operations of other vehicles, such as without limitation voyages, cruises, or patrols of maritime vessels such as ships or submarines. The flight of the aircraft 16 includes several phases, such as a gate phase 18, a start phase 20, and a taxi-from-gate phase 22, during which the aircraft 16 is on the ground and is not yet airborne. The flight of the aircraft 16 also includes airborne phases such as a climb phase 24 during which the aircraft 16 takes off and climbs to cruising altitude, a cruise phase 26 during which the aircraft 16 cruises at altitude, and a descent phase 28 during which the aircraft 16 descends from cruising altitude and lands. The flight of the aircraft 16 also includes a taxi-to-gate phase 30 after the aircraft 16 lands.

Figure 3:
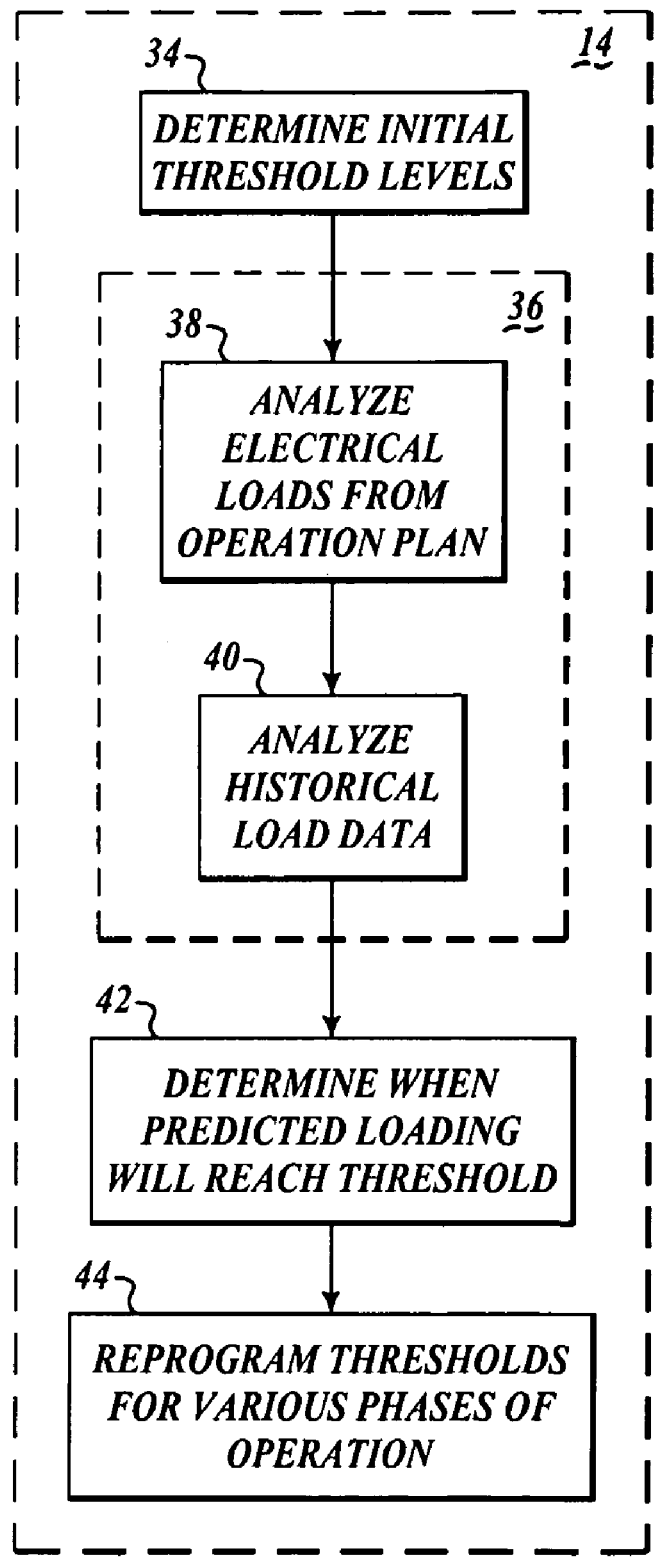
FIGS. 3 and 4 are flow charts of details of the method of FIG. 1.

At the block 14, a profile 32 of predetermined threshold levels of electrical loading is developed for the phases 18, 20, 22, 24, 26, 28, 30, and 32. In an exemplary embodiment and referring additionally to FIG. 3, at a block 34 a profile is developed of initial predetermined thresholds of electrical loading above which electrical load is not to be added to an electrical power generation system. The profile of initial threshold levels may be made based upon historical thresholds established for use with PID or other types of load management systems during the phases 18, 20, 22, 24, 26, 28, 30, and 32. The initial threshold levels may additionally be based on the limits of the protective functions in the generating system, from operational information derived from historical correlation of the load data from previous flights with the flight profile from the Flight Management System, and the actual real-time capability of the engine to produce electrical power based on operational data from the Electronic Engine Control (e.g. Flight Phase Engine Power Capability—M "the required power margin".)

At a block 36 electrical loading during the phases 18, 20, 22, 24, 26, 28, 30, and 32 is predicted using planning or predictive information from a flight plan (such as may be loaded into a flight computer like a flight management system or the like). The analysis at the block 36 may be made based on a correlation made at a block 38 of typical electrical loading with events in the flight plan that are planned to occur during the phases 18, 20, 22, 24, 26, 28, 30, and 32. The prediction of electrical loading at the block 36 may also include an analysis of historical load data, if desired, at an optional block 40.

At a block 42 a determination is made when predicted electrical loading for the phases 18, 20, 22, 24, 26, 28, 30, and 32 will reach the initial threshold levels. To that end, the predicted electrical loading from the block 36 is compared with the initial thresholds from the block 34. At a block 44 the initial thresholds are re-programmed for various phases of the flight based on predicted loading reaching the initial thresholds. For example, the re-programmed thresholds may be lowered slightly from the initial thresholds during the descent phase 28 and raised slightly from the initial thresholds during the cruise phase 26. The re-programmed thresholds might also be lowered from the initial thresholds during transitions from one flight phase to another such as "top of climb" or "top of descent" or other times when the engine might be more susceptible to transient changes in electrical load. This re-programming of the initial thresholds provides the threshold profile 32 for the entire flight. This re-programmed profile is more optimum than the initial profile because the margin between the engine's capability to generate electrical power and the load is greater for more of the flight phases.

Figure 4:
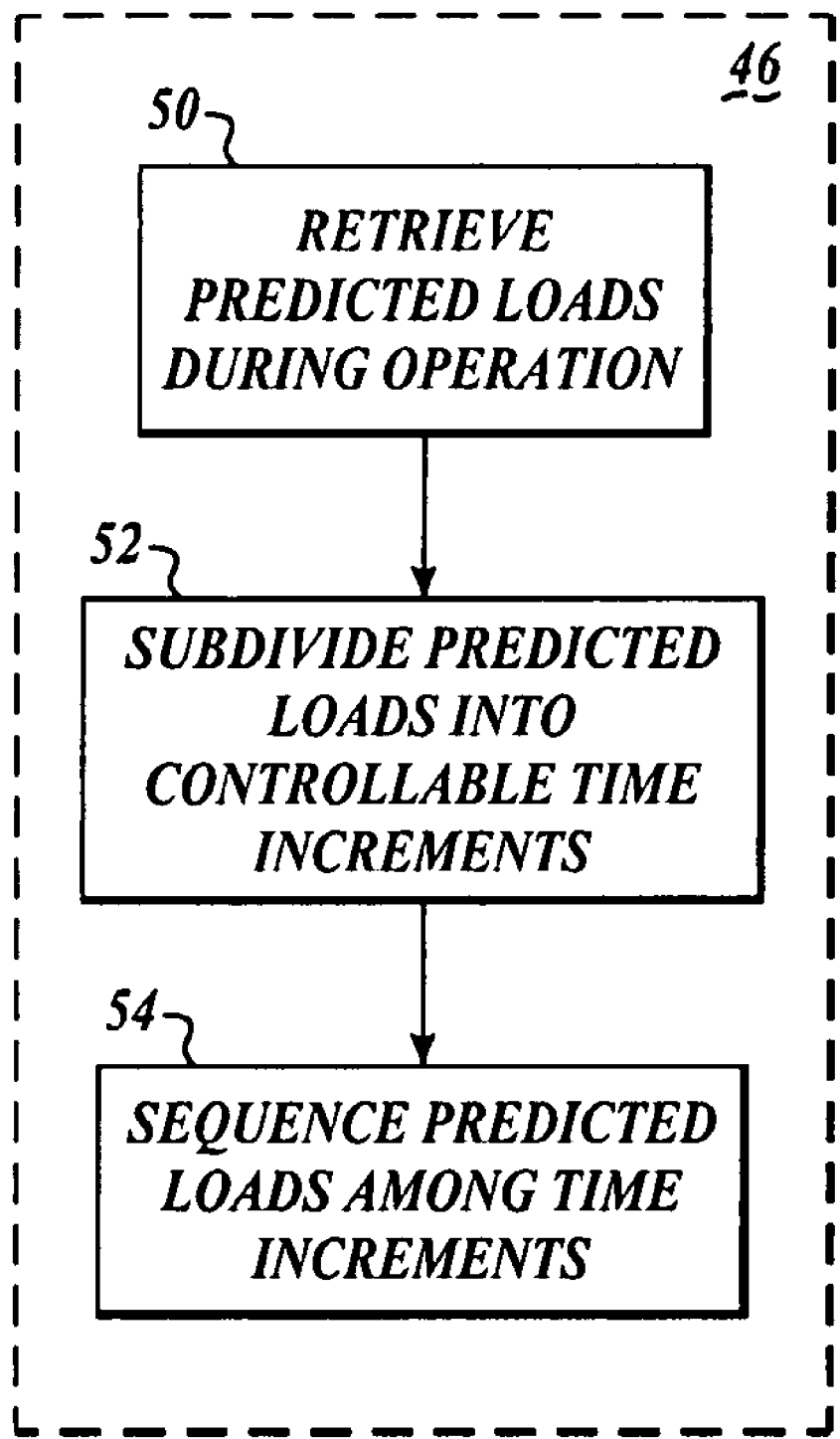

Referring now to FIGS. 1, 2, and 4, at the block 46 a profile 48 of electrical loading is developed for the phases 18, 20, 22, 24, 26, 28, 30, and 32 such that electrical loading throughout the profile 48 is substantially a same margin M below the threshold levels throughout the profile 32 during the phases 18, 20, 22, 24, 26, 28, 30, and 32. At a block 50 the electrical loads for the phases 18, 20, 22, 24, 26, 28, 30, and 32 that were predicted at the block 36 (FIG. 3) are retrieved.

Figure 5A:
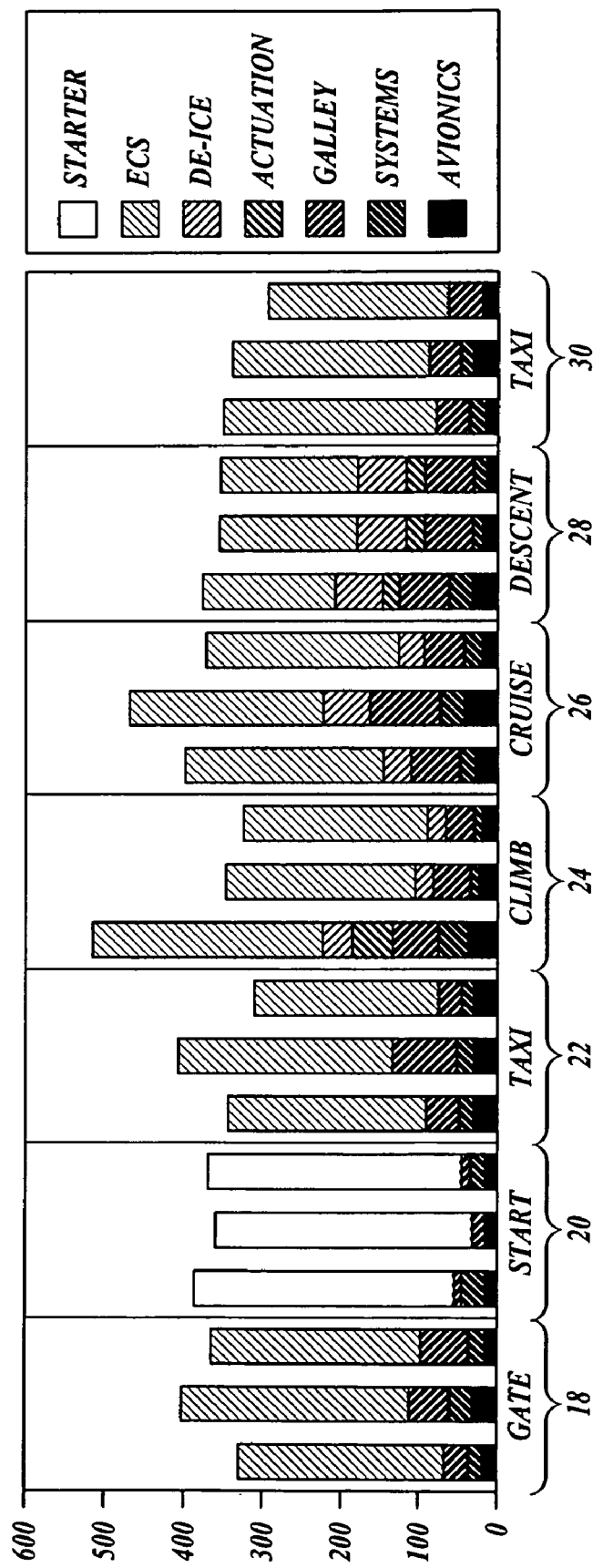
FIGS. 5A and 5B illustrate sequencing of electrical loading.
Figure 5B:
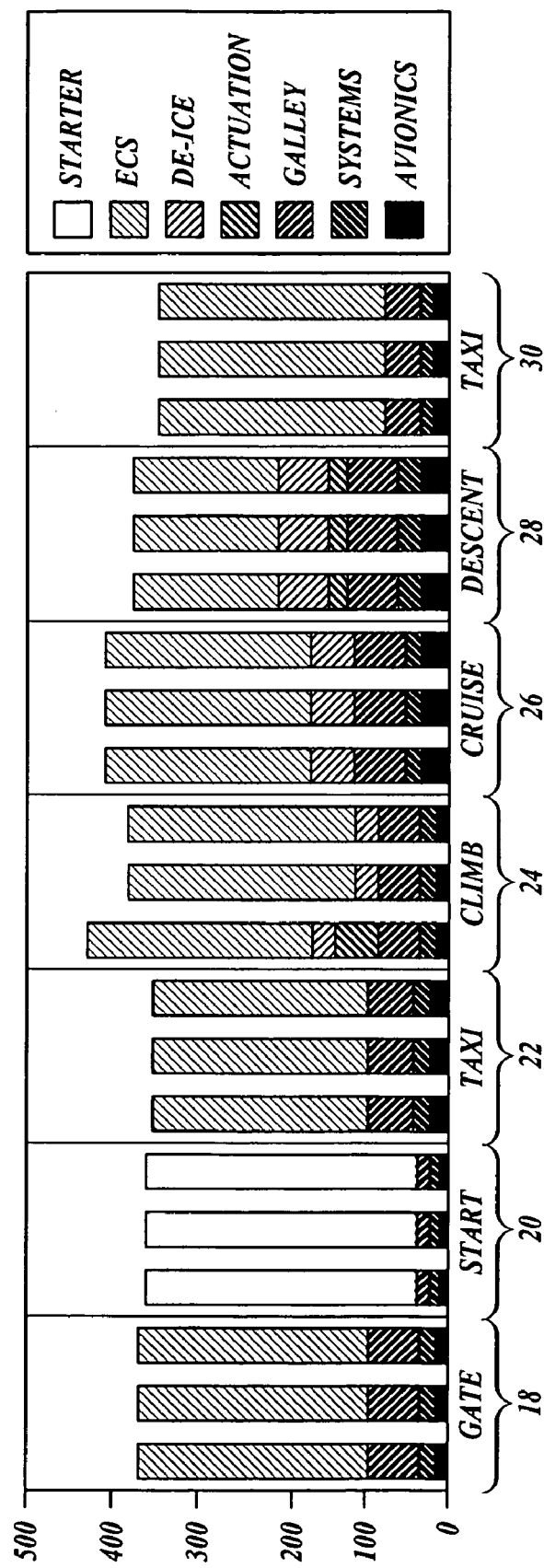

At a block 52 the predicted electrical loads are subdivided into controllable time increments. Referring additionally to FIG. 5A and given by way of non-limiting example, each of the phases 18, 20, 22, 24, 26, 28, 30, and 32 is subdivided into three time increments. However, any number of time increments may be selected as desired for a particular application. The more time increments that are selected, the greater the granularity can be achieved in subsequent re-sequencing of the loads. The greater granularity in re-sequencing is to be balanced with greater processing costs.

When the phases 18, 20, 22, 24, 26, 28, 30, and 32 are initially subdivided into controllable time increments at the block 52, the predicted electrical loading has not yet been optimized to reduce overall loading levels. Thus, predicted electrical loading can range from less than 300 KW during the last time increment of the taxi-to-gate phase 30 to a maximum loading of around 500 KW during the first time increment of the climb phase 24. This initial predicted loading presents a peak-to-peak load swing of greater than 200 KW. Except for the start phase 20 (which is dominated by starter loading and is, therefore, substantially equalized), loading during the phases 18, 22, 24, 26, 28, 30, and 32 is not yet equalized or minimized.

At a block 54 predicted electrical loads for a phase are re-sequenced among the time increments for the phase such that electrical loading is substantially equalized for all of the time periods of the phase. The re-sequencing of the loads at the block 54 is performed for all of the phases 18, 20, 22, 24, 26, 28, 30, and 32.

Referring now to FIGS. 1, 2, 4, and 5B, predicted electrical loads for each of the phases 18, 20, 22, 24, 26, 28, 30, and 32 have been re-sequenced among the time increments into which each of the phases 18, 20, 22, 24, 26, 28, 30, and 32 have been subdivided. Any of several exemplary load sequencing schemes may be used. In general, electrical loads are controlled so maximum loads do not arbitrarily coincide.

Several load sequencing techniques will be given by way of non-limiting example. For example, electrical loads in an environmental control system (ECS) can be controlled such that maximum loading does not occur in a same time increment when other loads are at a maximum. For example, ECS loads (such as heaters, compressors, fans, and the like) can be cycled on for short time periods and off for short time periods instead of remaining on for long time periods and off for long time periods. Light intensity can be optimized within an ECS to prevent needlessly maximizing light intensity. ECS mode control can also be optimized between standby and charging modes. Similarly, de-icing loads may be cycled on and off instead of remaining continuously on. As a further example, galley loads (such as coffee pots, ovens, refrigeration compressors, and the like) need not all be on at the same time and instead can be scheduled to be on at different times. As another example, starting of motors, such as fan motors (part of the ECS) and fuel pump motors, can be sequenced such that motor starting current surges do not occur at the same time.

Further, during engine starting it may be desirable to schedule no loads other than those associated with engine startup. This approach may be desirable in cases where starting an engine can take around 450 KW of electrical power that is provided by either shore power, an auxiliary power unit (APU), or battery power. Once an engine has been started, then loads may be supplied by the onboard generator associated with the started engine. Given by way of non-limiting example, an engine electronic control system can supply an engine speed signal that indicates a minimum engine speed above which a generator can assume load.

As a result of re-sequencing loads as discussed above, loads in the time increments in each of the phases 18, 20, 22, 26, 28, 30, and 32 have been substantially equalized (with the load in the first time increment of the climb phase 24 being higher than loads in the other time increments of the climb phase 24). Moreover, the re-sequenced electrical loading ranges from a minimum loading of around 325 KW during all of the time increments of the taxi-to-gate phase 30 to a maximum loading of around 425 KW during the first time increment of the climb phase 24. The re-sequenced loading thus presents a peak-to-peak load swing of only around 100 KW. Thus, the re-sequenced loading has a lower peak load and reduced peak-to-peak loading from the predicted loading that was not yet re-sequenced.

Referring back to FIGS. 1 and 2, after the loads have been re-sequenced at the block 54 (FIG. 4) the load profile 48 is compared to the threshold 32 at a block 56. A determination is made at a decision block 58 whether the difference between the load profile 48 and the threshold profile 32 is less than the margin M. When the difference between the load profile 48 and the threshold profile 32 is less than the margin M, at a block 60 the load profile 48 and/or the threshold profile 32 is updated to maintain the margin M between the load profile 48 and the threshold profile 32.

If the load profile 48 has been adjusted at the block 60 (as determined at a decision block 62), then at a block 64 loads are adjusted accordingly during operations to implement changes to the load profile 48. When operations are complete (as determined at a decision block 66), the method 10 stops at a block 68. When operations are not complete, processing returns to the block 56.

When the difference between the load profile 48 and the threshold profile 32 is not less than the margin M, the method 10 proceeds from the decision block 58 to a block 70 at which operational data is received. The operational data can include real-time data, plotted as an exemplary non-limiting profile 72, regarding an electrical power system's capacity to generate electrical power. Given by way of non-limiting example, real-time data regarding electrical power system's capacity to generate electrical power may be provided by an electronic engine control system.

At a block 74 the electrical power system's capacity to generate electrical power, represented by the profile 72, is compared to the threshold profile 32. At a decision block 74 a determination is made whether the electrical power system's capacity to generate electrical power is less than the threshold level. If so, then processing continues to the block 60, at which the threshold profile 32 and/or the load profile 48 may be updated as desired. If not, then processing continues to the decision block 66.

The operational data can also include real-time load data provided from load controllers such as motor controllers or solid state power controllers. Large systems, such as without limitation an environmental control system, can also provide its own load data via load centers.

At a block 78, real-time load data is compared to the load profile 48. At a decision block 80 a determination is made whether actual load (represented by the real-time data) is greater than the load profile 48. If so, then processing continues to the block 60, at which the threshold profile 32 and/or the load profile 48 may be updated as desired. If not, then processing continues to the decision block 66. Processing of the blocks 74 and 78 may occur in any order as desired. The block 74 may be performed before the block 78, or the block 78 may be performed before the block 74, or the blocks 74 and 78 may be performed simultaneously, as desired.

Referring now to FIG. 6, an exemplary power and load management system 100 operates within an exemplary host environment 102 to adaptively manage electrical power within the host environment 102. The system 100 includes a suitable computer processor (or processors) that can execute instructions to perform analyses associated with the method 10 (FIG. 1) and that can generate control signals (to control loads and generators) associated with the method 10 (FIG. 1). Computer processors are known in the art, and therefore a discussion of their construction and operation is not necessary. The system 100 also includes suitable input interfaces for receiving planned or predictive data and for receiving real-time operational data and output interfaces for providing control signals.

The host environment 102 suitably is an electrical power generation and distribution system and associated loads onboard a vehicle, such as an aircraft. However, the host environment 102 can be an electrical power generation and distribution system and associated loads onboard a maritime vessel, such as a ship or a submarine, that has similar operational planning data and real-time operational data as an aircraft.

A flight management system (FMS) provides data to the system 100. A guidance buffer resides in storage 106 that can be accessed by the FMS 104. The guidance buffer includes target thrust settings for driving autothrottles. These settings can be correlated to predicted electrical power generation capacity for an electrical generator that is driven by an aircraft engine (that is in turn controlled by the thrust settings of the autothrottles).

A flight plan also resides in storage 106. The flight plan provides a profile of several parameters for all of the phases 18, 20, 22, 24, 26, 28, 30, and 32 (FIG. 2). The parameters include altitude, heading, thrust settings, predicted top of climb, predicted top of descent, and step climbs that are correlated against phase in the flight and elapsed time in the flight. Each of these flight phases or segments has detailed time information associated with it. This detailed flight information can then be correlated with the associated airplane electrical loads during that phase of flight.

The FMS 104 also provides real-time flight status to the system 100. The FMS 104 provides real-time data regarding where the aircraft 16 (FIG. 2) is relative to the flight plan.

An electronic engine control system 108 controls engines 110 and provides real-time operational data to the system 100 regarding operation of the engines 100 and any associated limitations on power extraction. Thus, the electronic engine control system 108 provides real-time data regarding excess load-carrying capability of the engines 110. To that end, the electronic engine control system 108 provides real-time operational data regarding capacity of the electrical power generating system to generate electrical power and accept loading.

The system 100 receives real-time load data. Loads 112 (that may be individual loads or groups of loads) are controlled by load controllers 114, such as solid state power controllers. Real-time data regarding which of the loads 112 are operating (and when the loads 112 are operating) is provided to the system 100 from the load controllers 114 via a multiplexer 116. Similarly, motor drives 118 are controlled by motor controllers 120. Real-time data regarding which of the motor drives 118 are operating (and when the motor drives 118 are operating) is provided to the system 100 from the motor controllers 120 via the multiplexer 116.

When loads are to be adjusted (such as at the block 64 (FIG. 1)), the system 100 provides an appropriate control signal to a desired load controller 114 or a desired motor controller 120 via the multiplexer 116. If larger groups of loads are to be controlled (such as by shutting down a portion of a transfer bus 122), then the system 100 provides a control signal to a bus power control unit 124 which, in turn, controls the transfer bus 122.

When the threshold profile is to be adjusted (such as at the block 60 (FIG. 1)), the system 100 provides an appropriate control signal to a generator control unit 126. The generator control unit 126 controls an electrical power generator 128. The generator control unit 126 may be part of the electronic engine control system 108 or may be a standalone system, as desired.

In another exemplary embodiment, an energy storage device or devices may be used to power loads when the threshold levels 32 exceed electrical power generating capacity 72 and/or may be used to store electrical power when electrical power generating capacity 72 exceeds the threshold levels 32. Referring back to FIG. 2, in this non-limiting example the threshold levels 32 exceed electrical power generating capacity 72 during the phases 18, 20, 22, 28, and 30 and electrical power generating capacity 72 exceeds the threshold levels 32 during the phases 24 and 26.

Figure 7:
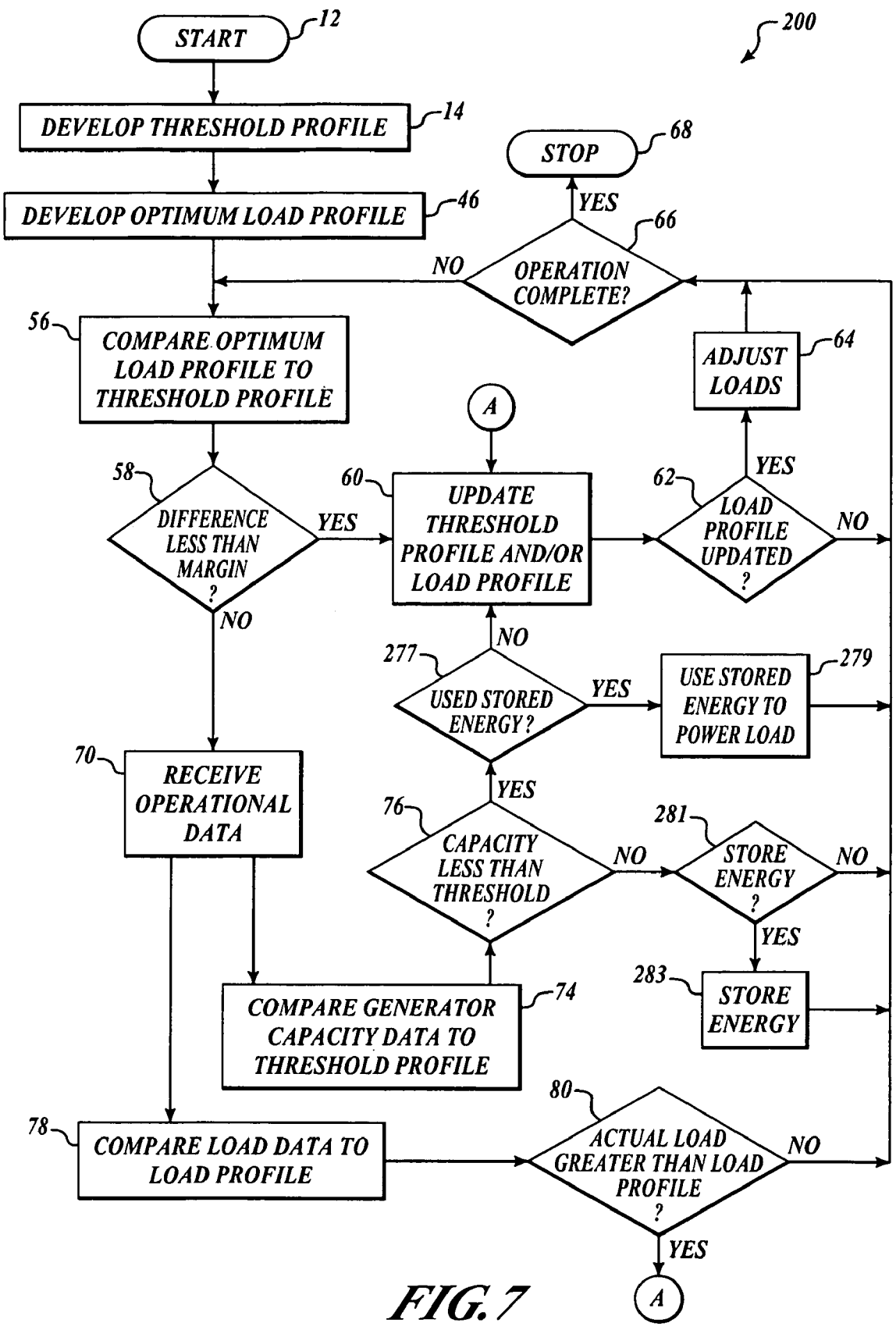
FIG. 7 is a flow chart of another exemplary method of adaptively managing electrical power.

Referring additionally to FIG. 7, in another exemplary embodiment a method 200 permits an energy storage device or devices (such as a capacitor bank, a bank of batteries, a flywheel energy storage device, or the like) to be used to power loads when the threshold levels 32 exceed electrical power generating capacity 72 and/or to store electrical power when electrical power generating capacity 72 exceeds the threshold levels 32. The method 200 includes all of the processing blocks of the method 10 (FIG. 1). Therefore, for the sake of brevity details of the processing blocks of the method 10 (FIG. 1) will not be repeated. The same reference numbers for processing blocks of the method 10 (FIG. 1) are also used for the same processing blocks in the method 200.

In the method 200, when a determination is made at the decision block 76 that electrical power generating capacity 72 is less than the threshold levels 32, processing continues to a decision block 277 at which a determination is made whether to use stored energy to power loads. If so, then at a block 279 the stored energy device(s) is used to power loads. Processing then continues to the block 66. If not, then processing continues to the block 60.

If electrical power generating capacity 72 is greater than the threshold levels 32, then at a decision block 281 a determination is made whether to store energy in the energy storage device(s). If so, then at a block 283 energy is stored in the energy storage device(s). Processing then continues to the block 66. If not, processing proceeds from the decision block 281 to the block 66.

Figure 8:
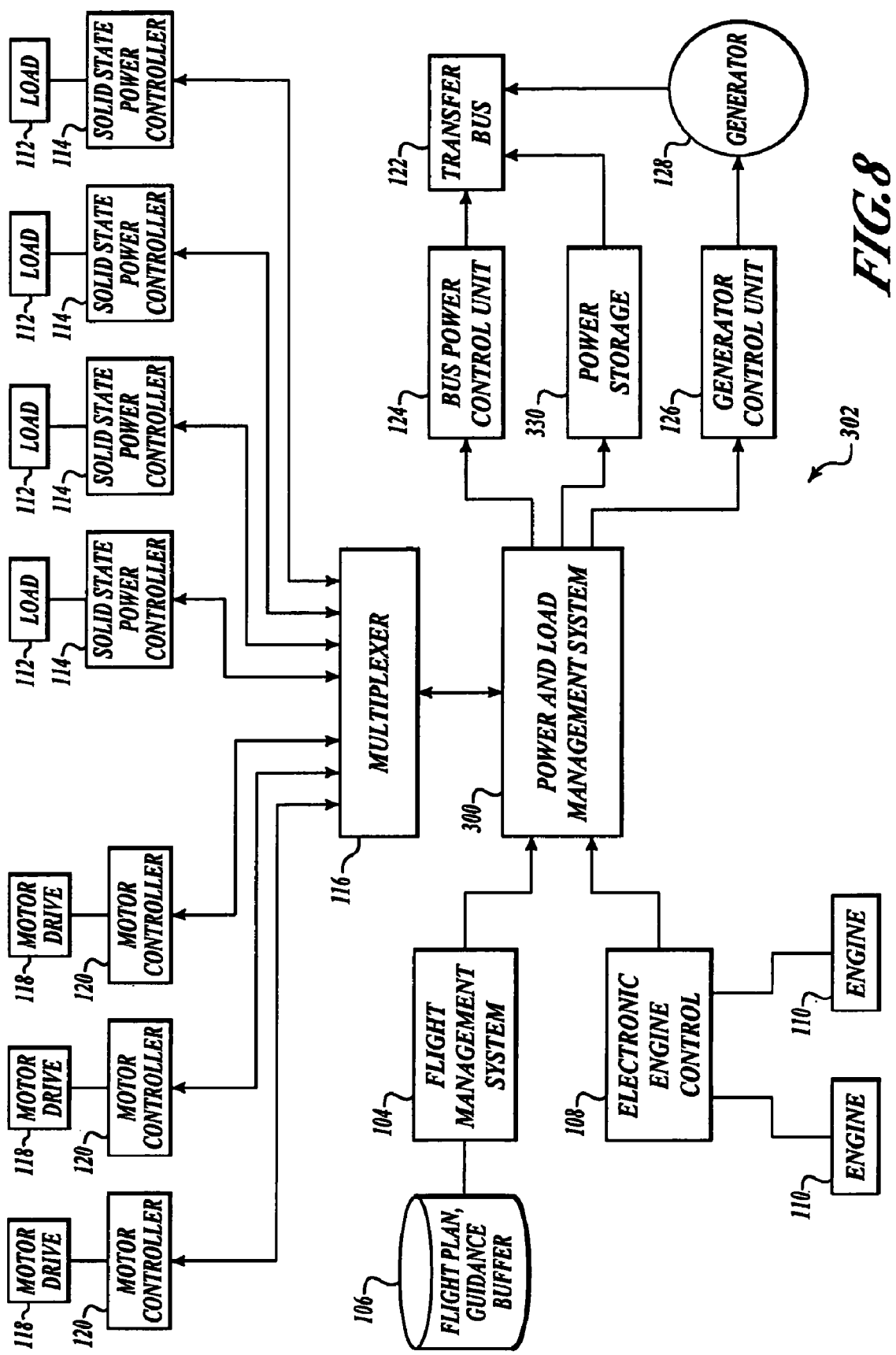
FIG. 8 is a block diagram of another exemplary system for adaptively managing electrical power.

Referring additionally now to FIG. 8, in another exemplary embodiment a system 300 permits an energy storage device or devices 330 (such as a capacitor bank, a bank of batteries, a regenerative fuel cell, a flywheel energy storage device, or the like) to be used to power loads in an exemplary host environment 302 when the threshold levels 32 exceed electrical power generating capacity 72 and/or to store electrical power when electrical power generating capacity 72 exceeds the threshold levels 32. The system 300 includes all of the processing components of the system 100 (FIG. 6) and the host environment 302 includes all of the components of the host environment 102 (FIG. 6). Therefore, for the sake of brevity details of the system 100 (FIG. 6) and the host environment 102 (FIG. 6) will not be repeated. The same reference numbers for components of the host environment 102 (FIG. 6) are also used for the same components of the host environment 302.

When electrical power generating capacity 72 is less than the threshold levels 32 and a determination is made to use energy stored in the energy storage device(s) 330 to power loads, the system 300 provides a control signal to the energy storage device(s) 330. In response to the control signal from the system 300, the energy storage device(s) 330 use stored electrical power to power the loads. When electrical power generating capacity 72 is greater than the threshold levels 32 and a determination is made to store energy in the energy storage device(s), the system 300 provides a control signal to the energy storage device(s) 330 to store electrical power. In response to the control signal from the system 300, the energy storage device(s) 330 store electrical power. The stored electrical power may be used as desired to power loads as described above.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A method of adaptively managing electrical power on an aircraft, the method comprising:

developing a profile of a plurality of threshold levels of electrical loading for a plurality of phases of a flight of an aircraft by analyzing at least one source of information chosen from a flight plan and historical electrical loading data, the plurality of phases of the flight including gate, start, taxi from gate, climb, cruise, descent, and taxi to gate;

developing a profile of electrical loading for each of a plurality of flight-related systems and a plurality of aircraft cabin systems for the plurality of phases of the flight wherein the profile of electrical loading indicates:

maintaining electrical loading below the threshold levels by substantially a same predetermined margin during the plurality of phases of the flight; and sequencing electrical loads over time periods within a particular phase of the flight to substantially equalize electrical loading over the time periods during the particular phase of the flight;

receiving in-flight data during the plurality of phases of the flight where the in-flight data is indicative of at least one parameter chosen from an ability of an electrical power generation system of the aircraft to support electrical loading and a level of electrical loading, the in-flight data being received from at least one data source chosen from an electronic engine control system and a load controller; and adjusting at least one profile chosen from the profile of the plurality of threshold levels and the profile of electrical loading responsive to the in-flight data such that electrical loading is maintained below the threshold levels by at least the predetermined margin during the plurality of phases of the flight.

2. The method of claim 1, further comprising:

comparing the profile of the plurality of threshold levels and the profile of electrical loading; and adjusting at least one profile chosen from the profile of the plurality of threshold levels and the profile of electrical loading responsive to the comparison such that electrical loading is maintained substantially the same predetermined margin below the threshold levels during the plurality of phases of the flight.

3. The method of claim 1, wherein developing the profile of the plurality of threshold levels includes:

determining an initial threshold level above which electrical load is not to be added to the electrical power generation system;

analyzing when in the flight the initial threshold level will be reached;

establishing threshold levels below the initial threshold level when the initial threshold level will not be reached; and establishing threshold levels above the initial threshold level when the initial threshold level will be reached.

4. The method of claim 1, wherein sequencing the electrical loads includes:

scheduling a first electrical load to operate at its maximum electrical loading level in one of the time periods of the particular phase of the flight; and scheduling a second electrical load to operate at its maximum electrical loading level in another of the time periods of the particular phase of the flight.

5. The method of claim 3, wherein:

threshold levels are established below the initial threshold level during the gate, start, taxi from gate, descent, and taxi to gate phases; and threshold levels are established above the initial threshold level during the climb and cruise phases.

6. A system to adaptively manage electrical power on an aircraft, the system comprising:

a first input interface configured to receive planning data regarding a flight, the flight including a plurality of phases including gate, start, taxi from gate, climb, cruise, descent, and taxi to gate, the planning data including at least one data set chosen from a flight plan and historical electrical loading data;

a second input interface configured to receive from an electronic engine control system, during the plurality of phases of the flight, first in-flight data indicative of an ability of an electrical power generation system of an aircraft to support electrical loading;

an input/output interface configured to receive from at least one load controller, during the plurality of phases of the flight, second in-flight data indicative of electrical loading; and a processor including:

a first processing component configured to develop a profile of a plurality of threshold levels of electrical loading for the plurality of phases of the flight;

a second processing component configured to develop a profile of electrical loading for each of a plurality of flight-related systems and for a plurality of aircraft cabin systems for the plurality of phases of the flight such that electrical loading is substantially a same predetermined margin below the threshold levels during the plurality of phases of the flight;

a third processing component configured time periods within a particular phase of the flight to substantially equalize electrical loading over the time periods during the particular phase of the flight; and a fourth processing component configured to adjust at least one profile chosen from the profile of the plurality of threshold levels and the profile of electrical loading responsive to the second in-flight data such that electrical loading is maintained substantially the same predetermined margin below the threshold levels during the plurality of phases of the flight.

7. The system of claim 6, wherein the first processing component is further configured to:

determine an initial threshold level above which electrical load is not to be added to the electrical power generation system;

analyze when in the flight the initial threshold level will be reached;

establish threshold levels below the initial threshold level when the initial threshold level will not be reached; and establish threshold levels above the initial threshold level when the initial threshold level will be reached.

8. The system of claim 6, wherein the second processing component is further configured to:

schedule a first electrical load to operate at its maximum electrical loading level in one of the time periods of the particular phase of the flight; and schedule a second electrical load to operate at its maximum electrical loading level in another of the time periods of the particular phase of the flight.

9. The system of claim 6, wherein the at least one load controller includes a controller chosen from a motor controller and a solid state power controller.

10. The system of claim 9, wherein the input/output interface is further configured to provide control data to the at least one load controller for controlling at least one load.

11. A method of adaptively managing electrical power, the method comprising:

developing a profile of a plurality of threshold levels of electrical loading for each of a plurality of phases of an operation;

developing a profile of electrical loading for each of a plurality of flight-related systems and for a plurality of aircraft cabin systems for the plurality of phases of the operation and for each of a plurality of time increments into which the phases of operation are divided such that electrical loading is substantially equalized over the time increments of each of the plurality of phases and is substantially below the threshold levels by at least a predetermined margin during the plurality of phases of the operation;

receiving operational data during the plurality of phases of the operation including first operational data indicative of an ability of an electrical power generation system to support electrical loading and second operational data indicative of electrical loading; and comparing the first operational data with the second operational data indicative of electrical loading to determine whether the electrical loading is below the ability of the electrical power generation system to support electrical loading by at least the predetermined margin.

12. The method of claim 11, further comprising using stored power to power electrical loading when the electrical loading is greater than the ability of the electrical power generation system to support electrical loading.

13. The method of claim 11, further comprising storing power when the electrical loading is less than the ability of the electrical power generation system to support electrical loading.

14. A system to for adaptively manage electrical power, the system comprising:
    a power storage device;
    a first input interface configured to receive data regarding an operation plan related to an operation, the operation including a plurality of phases;
    a second input interface configured to receive, during the plurality of phases of the operation, first operational data indicative of an ability of an electrical power generation system to support electrical loading;
    an input/output interface configured to receive, during the plurality of phases of the operation, second operational data indicative of electrical loading; and
    a processor including:
        a first processing component configured to develop a profile of a plurality of threshold levels of electrical loading for the plurality of phases of the operation;
        a second processing component configured to develop a profile of electrical loading for each of a plurality of flight-related systems and for a plurality of aircraft cabin systems for the plurality of phases of the operation and for each of a plurality of time increments into which the plurality of phases are divided such that electrical loading is substantially equalized over the plurality of time increments within each of the plurality of phases and is substantially below the threshold levels by at least a predetermined margin during the plurality of phases of the operation; and
        a third processing component configured to compare the first operational data with the second operational data indicative of electrical loading.

15. The system of claim 14, wherein the third processing component is further configured to cause the power storage device to use stored power to power electrical loading when the electrical loading is greater than the ability of the electrical power generation system to support electrical loading.

16. The system of claim 14, wherein the third processing component is further configured to cause the power storage device to store power when the electrical loading is less than the ability of the electrical power generation system to support electrical loading.

17. A method of adaptively managing electrical power for a plurality of time periods during one or more phases of an operation, the method comprising:
    determining a threshold level of electrical loading supported by an electrical generation system for a particular phase of the one or more phases of the operation;
    scheduling operation of each of a plurality of functional groups of loads such that:
        a total level of the electrical loading of the plurality of functional groups is substantially equalized for the plurality of time periods within the particular phase; and
        the total level of the electrical loading of the plurality of functional groups of loads is maintained below the threshold level of electrical loading for the particular phase by at least a predetermined margin;
    receiving operational data during the operation indicative of a capacity of the electrical power generation system to generate electrical power; and
    adjusting the total level of the electrical loading such that the total level of the electrical loading is maintained below the actual capacity of the electrical power generation system by at least the predetermined margin.

18. The method of claim 17, further comprising determining the total level of electrical loading and the threshold level of electrical loading from historical data of one or more previous operations.

19. The method of claim 18, wherein the total level of electrical loading and the threshold level of electrical loading are determined before commencing the operation according to a plan of the operation.

20. The method of claim 17, wherein the operation includes a flight of an aircraft and wherein the one or more phases of the operation include:
    a gate phase;
    a start phase;
    a taxi from gate phase;
    a climb phase;
    a cruise phase;
    a descent phase; and
    a taxi to gate phase.

21. The method of claim 20, wherein the plurality of functional groups of loads includes cabin systems and flight systems.

22. The method of claim 21, wherein the cabin systems include:
    an environmental control system; and
    a galley system.

23. The method of claim 21, wherein the flight systems include:
    a starter system;
    a de-icing system;
    an actuation system; and
    an avionics system.

24. The method of claim 17, further comprising adjusting the capacity of the electrical power generation system when the capacity of the electrical power generation system is not at least equal to the threshold level of electrical loading.

25. The method of claim 17, further comprising adjusting an electrical load supplied to one of the plurality of functional groups when the capacity of the electrical power generation system is not at least equal to the threshold level of electrical loading.

26. The method of claim 17, further comprising in response to determining that the capacity of the electrical power generation system exceeds the threshold level of electrical loading, storing electrical power exceeding the threshold level of electrical loading in an energy storage device.

27. The method of claim 17, further comprising in response to determining that the threshold level of electrical loading exceeds the capacity of the electrical power generation system, drawing stored electrical power from the energy storage device to supplement the actual capacity of the electrical power generation system.

28. A system to adaptively manage electrical power for a plurality of time periods during each of a plurality of phases of an operation, the system comprising:
   a first input interface to receive data regarding an operation plan for the plurality of phases of the operation;
   a second input interface to receive, during the plurality of phases of the operation, data indicating a capacity of an electrical power generation system to support electrical loading; and
   a power management system, wherein the power management system is configured to:
      determine a threshold level of electrical loading supported by the electrical power generation system for a particular phase of the plurality of phases;
      schedule operation of each of a plurality of functional groups of loads such that:
         a total level of the electrical loading of the plurality of functional groups is substantially equalized for the plurality of time periods in the particular phase; and
         the total level of the electrical loading of the plurality of functional groups is maintained below the threshold level of electrical loading by at least a predetermined margin;
      receive data indicating a measured capacity of the electrical power generation system to support electrical loading; and
      adjust the total level of the electrical loading such that the total level of the electrical loading is maintained below the measured capacity of the electrical power generation system by at least the predetermined margin.

29. The system of claim 28, wherein the power management system determines the total level of electrical loading and the threshold level of electrical loading from historical data of one or more previous operations received via the first input interface.

30. The system of claim 28, wherein the power management system determines the threshold level of electrical loading before commencing the operation according to the operation plan.

31. The system of claim 28, wherein the operation includes a flight of an aircraft and wherein the plurality of phases of the operation include:
   a gate phase;
   a start phase;
   a taxi from gate phase;
   a climb phase;
   a cruise phase;
   a descent phase; and
   a taxi to gate phase.

32. The system of claim 31, wherein the plurality of functional groups of loads includes cabin systems and flight systems.

33. The system of claim 32, wherein the cabin systems include:
   an environmental control system; and
   a galley system.

34. The system of claim 32, wherein the flight systems include:
   a starter system;
   a de-icing system;
   an actuation system; and
   an avionics system.

35. The system of claim 28, wherein the power management system sends a signal to adjust the capacity of the electrical power generation system when the measured capacity of the electrical power generation system is not at least equal to the threshold level of electrical loading.

36. The system of claim 28, wherein the power management system adjusts an electrical load supplied to one of the plurality of functional groups when the measured capacity of the electrical power generation system is not at least equal to the threshold level of electrical loading.

37. The system of claim 28, wherein in response to determining that the measured capacity of the electrical power generation system exceeds the threshold level of electrical loading, the power management system causes electrical power exceeding the threshold level of electrical loading to be stored in an energy storage device.

38. The system of claim 37, wherein in response to determining that the threshold level of electrical loading exceeds the measured capacity of the electrical power generation system, the power management system draws stored electrical power from the energy storage device to supplement the capacity of the electrical power generation system.

* * * * *